(12) United States Patent  (10) Patent No.: US 8,608,107 B2
Märtensson et al.  (45) Date of Patent: Dec. 17, 2013

(54) SYSTEM FOR AUTOMATIC OR PILOT CONTROLLED LANDING OF AIR VEHICLE

(75) Inventors: Johan Märtensson, Linköping (SE); Torbjörn Segerström, Malmköping (SE); Magnus Magnus, Linköping (SE); Andreas Gising, Linköping (SE)

(73) Assignee: Cybaero AB, Linkoping (SE)

( * ) Notice: Subject to any disclaimer, the term of this patent is extended or adjusted under 35 U.S.C. 154(b) by 652 days.

(21) Appl. No.: 12/811,717

(22) PCT Filed: Jan. 14, 2009

(86) PCT No.: PCT/SE2009/000010
§ 371 (c)(1),
(2), (4) Date: Sep. 15, 2010

(87) PCT Pub. No.: WO2009/091315
PCT Pub. Date: Jul. 23, 2009

(65) Prior Publication Data
US 2011/0006164 A1  Jan. 13, 2011

(30) Foreign Application Priority Data
Jan. 15, 2008 (SE) ..................... 0800094

(51) Int. Cl.
*B64F 1/00* (2006.01)
(52) U.S. Cl.
USPC ..................... 244/114 R; 114/261
(58) Field of Classification Search
USPC ............... 244/114 R, 116; 114/261, 258, 262
See application file for complete search history.

(56) References Cited

U.S. PATENT DOCUMENTS

| | | | |
|---|---|---|---|
| 3,878,805 A | | 4/1975 | Stevenson |
| 3,948,467 A | * | 4/1976 | Krusius .................. 244/116 |
| 7,152,547 B1 | | 12/2006 | Hovland |
| 7,299,762 B2 | * | 11/2007 | Chouery .................. 114/261 |
| 7,703,407 B2 | * | 4/2010 | Dunn ...................... 114/261 |
| 8,051,791 B2 | * | 11/2011 | Hovland et al. .......... 114/261 |
| 2006/0191459 A1 | * | 8/2006 | Chouery .................. 114/261 |

FOREIGN PATENT DOCUMENTS

| | | |
|---|---|---|
| DE | 102005004717 | 8/2006 |
| GB | 2440520 | 2/2008 |
| WO | WO 2007030936 | 3/2007 |

* cited by examiner

*Primary Examiner* — Christopher P Ellis
(74) *Attorney, Agent, or Firm* — Birch, Stewart, Kolasch & Birch, LLP

(57) ABSTRACT

A system for automatic or auto pilot controlled landing of air vehicle (2) with an undercarriage (10) with a substantially plane lower side, at a stationary or mobile landing place is described. The system is primarily characterized in that the landing plate is settable after two axes in roll and pitch, by a set mean controlled in relationship to the air vehicle and the horizontal plane. The air vehicle (2) and the landing plate (3) are provided with transmitter and receiver which define and communicate the mutual distance and the relative angles between the landing plate (3) and the undercarriage (10). Said set means is arranged to set said two axes such that the landing plate (3) will be substantially parallel to the lower side of the undercarriage (10).

19 Claims, 6 Drawing Sheets

Figure 1:
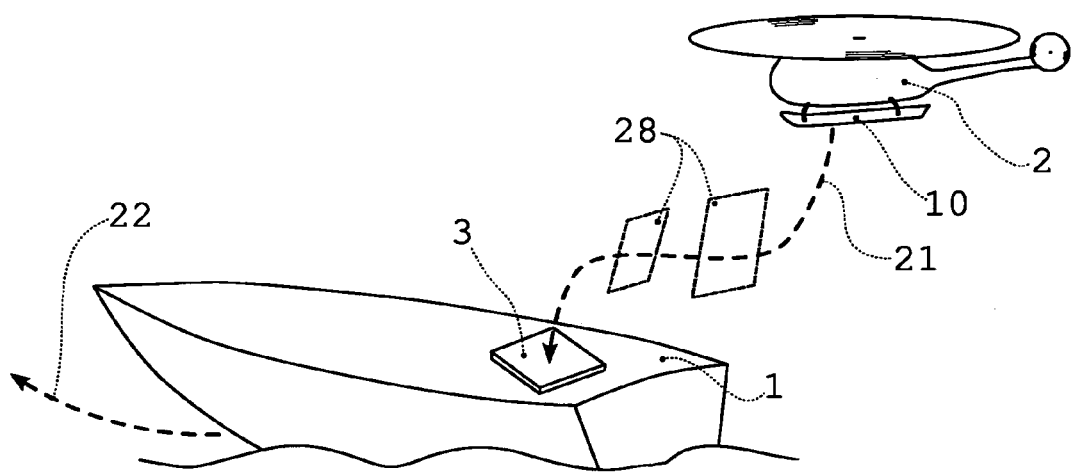

SYSTEM FOR AUTOMATIC OR PILOT CONTROLLED LANDING OF AIR VEHICLE

The present invention relates to a system for automatic or auto pilot controlled landing of air vehicle with an undercarriage with a substantially plane lower side, at a stationary or mobile landing place, with a substantially plane landing plate.

BACKGROUND

The increased utilization of unmanned air vehicles has focused upon the demand of the possibility to land with great precision and safety at a certain landing place, at the ground, at buildings or at mobile vehicles. The problems related to the landing procedure comprise questions as to estimation of the position, relative velocity and safety for persons and vehicles. In many applications the landing will take place in the vicinity of systems present and persons occupied by manual landing. The automatic flying movement should thus show a performance and characteristics similar to manual landing. This is especially true regarding landing at vessels at sea with helicopter. Today there are several assisting systems intended to assist the pilot and increase the safety in the very moment of landing. For a helicopter the rolling of the vessel and the wind conditions around the vessel are especially important. For manned helicopters the landing is often carried out with the assistance of several persons at the deck of the vessel, partly for guidance, but also for anchoring. Often this work is carried out during bad conditions and with a high risk for personal injuries.

the present invention relates especially to these conditions by giving the flying vehicle a landing plate, that adapts to the actual attitude of the helicopter. This may facilitate manned landings and unmanned landings and starts from vessels and other mobile vehicles. By combining this invention with known technologies within positioning; optical sensors and vacuum technology a new and safe landing system may be created, preferably for automatic flying vehicles.

A system for this may typically comprise combinations of the different system components (a) navigation system, (b) course planning system with prediction, (c) safety system, (d) landing plate with locking device and (e) undercarriage at the air vehicle. The system described is developed for helicopters, but it may partly or completely be used for flying vehicles with wings. The system may be used for unmanned as well as manned vehicles. As example of landing place a terrain lorry or a vessel may be mentioned.

(a) Navigation System

The navigation system for landing may differ from the one used for normal flying. They show different requirements for precision of positioning. This requirement is increased when the landing place is located at a mobile vehicle. The navigation system operates from an outer point and in to the landing plate. As an example may be mentioned a dGPS (Differential Global Position System) system with receivers at the landing plate as well as at the flying vehicle. This system may also be implemented with the aid of camera, optics or other sensors such as inductive, acoustic or laser based sensors. These are examples of technologies earlier used to measure mutual spatial relationships at mobile vehicles such as cars, vessels and helicopters.

(b) Path Planning and Prediction

A pre-requisite for the system to operate with a mobile landing place is a system, that can predict the future positions of the different vehicles. This landing progress thus comprises algorithms and software in order to predict the mutual positions of the vehicles. Often this is implemented by different filters such as Kalman-filter or the like. The prediction is carried out with information combined from sensors, primarily located at the vehicle carrying the landing plate and at the flying vehicle. Portions of the sensors of the navigation system are included in this part system. Sensor system and algorithms may be separated in the different phases of the landing progress. A system for measuring the relative distance between the landing plate and the vehicle either uses the sensor system of the landing vehicle or that of the flying vehicle, both in combination and separately.

(c) Safety System

In order to prevent an automatic landing to cause an injury at the landing place a system with safety limits may be created within the frame of the information handling system. These limits form corridors and sectors in the air space around the landing vehicle where the air vehicle is allowed to be present. This is similar to the different approach systems, that can be found at airports. These limits are intended to protect staff or vital portions of the landing vehicle. The predicted flight path is controlled in that the flying vehicle passes a number of control frames in the predicted flying corridor under its way towards the landing plate. In the case of a mobile landing vehicle these control frames will follow the landing vehicle. The safety system comprises functionality, that can judge if the landing progress shall be interrupted, both in a controlled way by one further approach trial or by a non-controlled landing within a predetermined space at a safe distance from the intended landing place.

(d) Landing Plate and Locking Device

The critical moment of the automatic landing is the very setting to ground and the immediate locking of the flying vehicle. Traditionally the very landing moment occurs at the most favorable point of time. In the case of landing of an helicopter at a vessel the pilot must often hover above the landing plate a short time to get an idea of the movements of the vessel. Different visual aids mounted at the vessel are used to facilitate this observation. For the very locking there are different solutions. An example of this is formed by harpoon-like fastening hooks, that are shot down into the plate from the helicopter and educated staff, that lock the helicopter at the landing plate by their own body weight and sand bags. In many cases this demands a special design of the surface of the landing plate and belonging lock means. Especially critical is the friction, that is created between the surface of the landing plate and the undercarriage at the flying vehicle. For a safe landing it must be possible to interrupt the landing progress immediately until the motor of the flying vehicle is stopped.

(e) Undercarriage at the Flying Vehicle

The undercarriage at a helicopter has several different functions, partly it shall aid as an assistance means at landing and start, but also as a protection at a possible crash or hard landing. Thus there are rules regarding its design. The undercarriage thus often is designed like skis. Its design in marine connection differs somewhat from that in landbased helicopters.

DESCRIPTION OF THE INVENTION

The object of the invention is to create a system of the art mentioned introductorily, that admits a safe landing of preferably automatic flying vehicles at a stationary or mobile landing place with a landing plate. According to the invention such a system is primarily characterized in that that the landing plate is settable after two axes in roll and pitch, by a set means controlled in relationship to the air vehicle and the horizontal plane, whereas the air vehicle and the landing plate are provided with transmitter and receiver which define and communicate the mutual distance and the relative angles between the landing plate and the undercarriage, whereas said set mean is arranged to set said two axes such that the landing plate will be substantially parallel to the lower side of the undercarriage.

The cooperating transmitters and receivers may be more or less advanced. In one simple embodiment the air vehicle is provided with at least two transmitters, arranged at mutual distance along a normal vector to the plane of the lower plane of the undercarriage and the landing plate is provided with at least three in the plane separated receivers, whereas the plane of the undercarriage in relationship to the plane of the landing plate is determinable by communication between transmitters and receivers. In this embodiment of the invention receiver and transmitter need not to be synchronized in time, and no introducing confirmation of established (one-way-) communication, ("handshaking") is needed. The information of the transmitters can comprise just single pulses, as the arrival time of the pulse in question at the receivers separates in the plane forms the basis for calculation.

The invention also is characterized by a vehicle designed for a system according the invention and a landing plate designed for a system according to the invention.

Other features of the invention are evident from the enclosed subclaims.

DESCRIPTION OF ONE EMBODIMENT OF THE SYSTEM ACCORDING TO THE INVENTION

Figure 2:
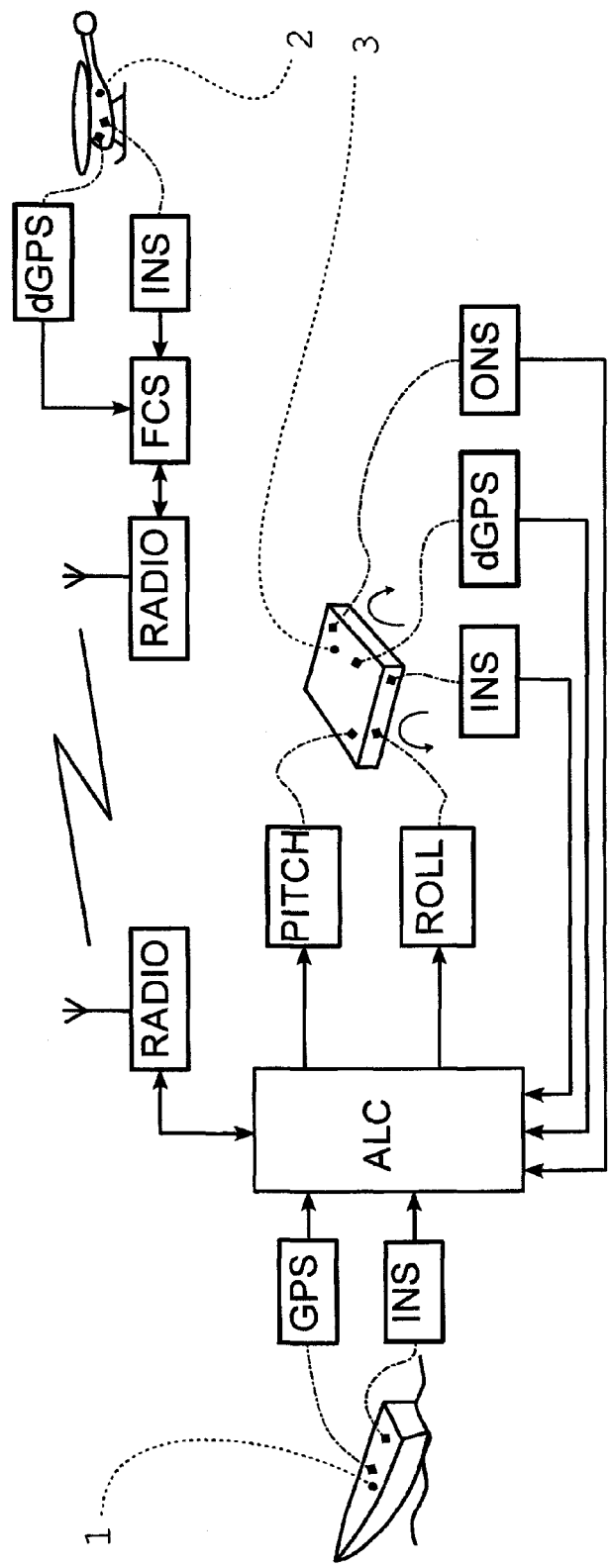
Figure 3:
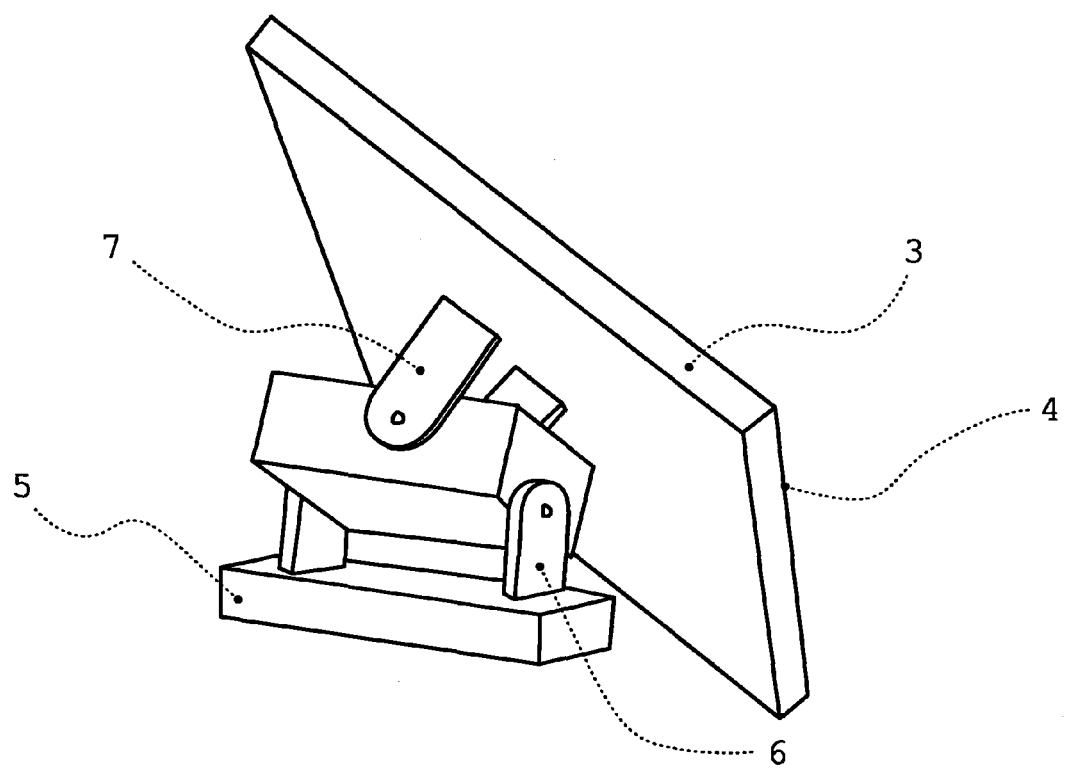
Figure 4:
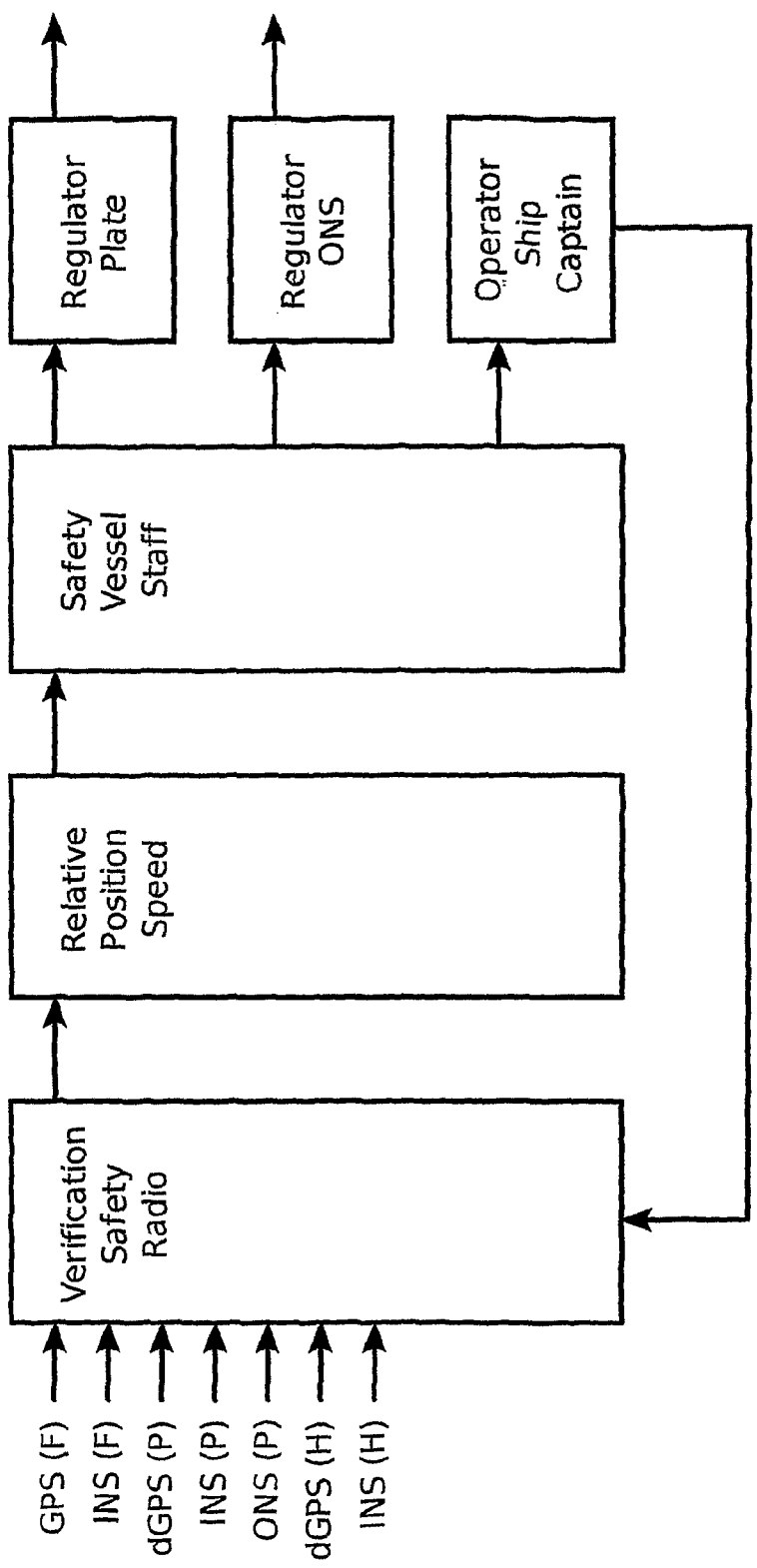
Figure 5:
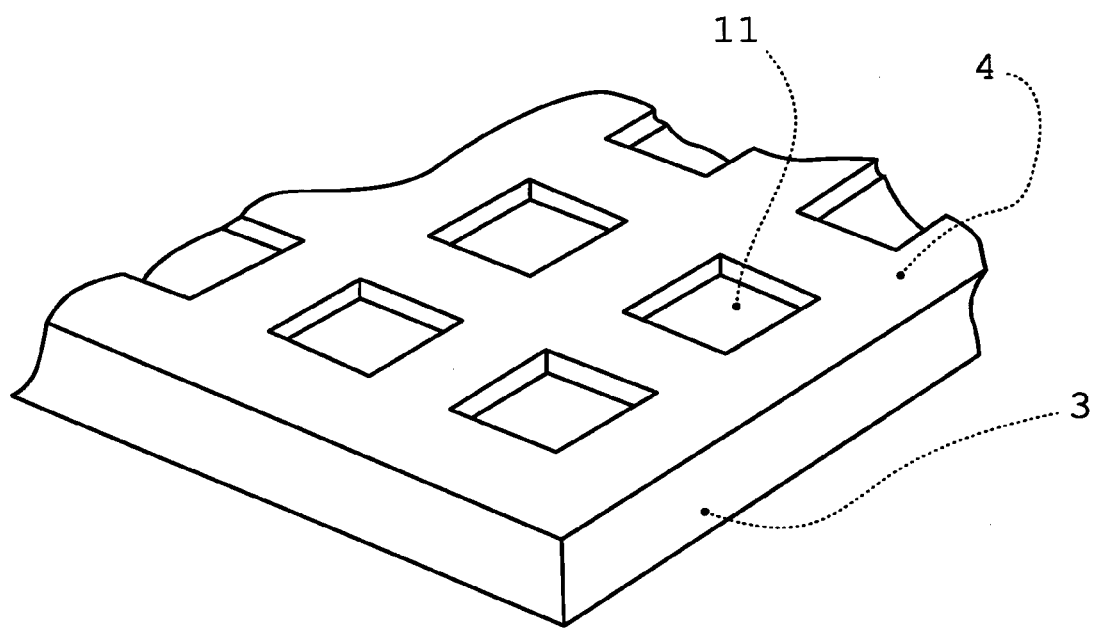
Figure 6:
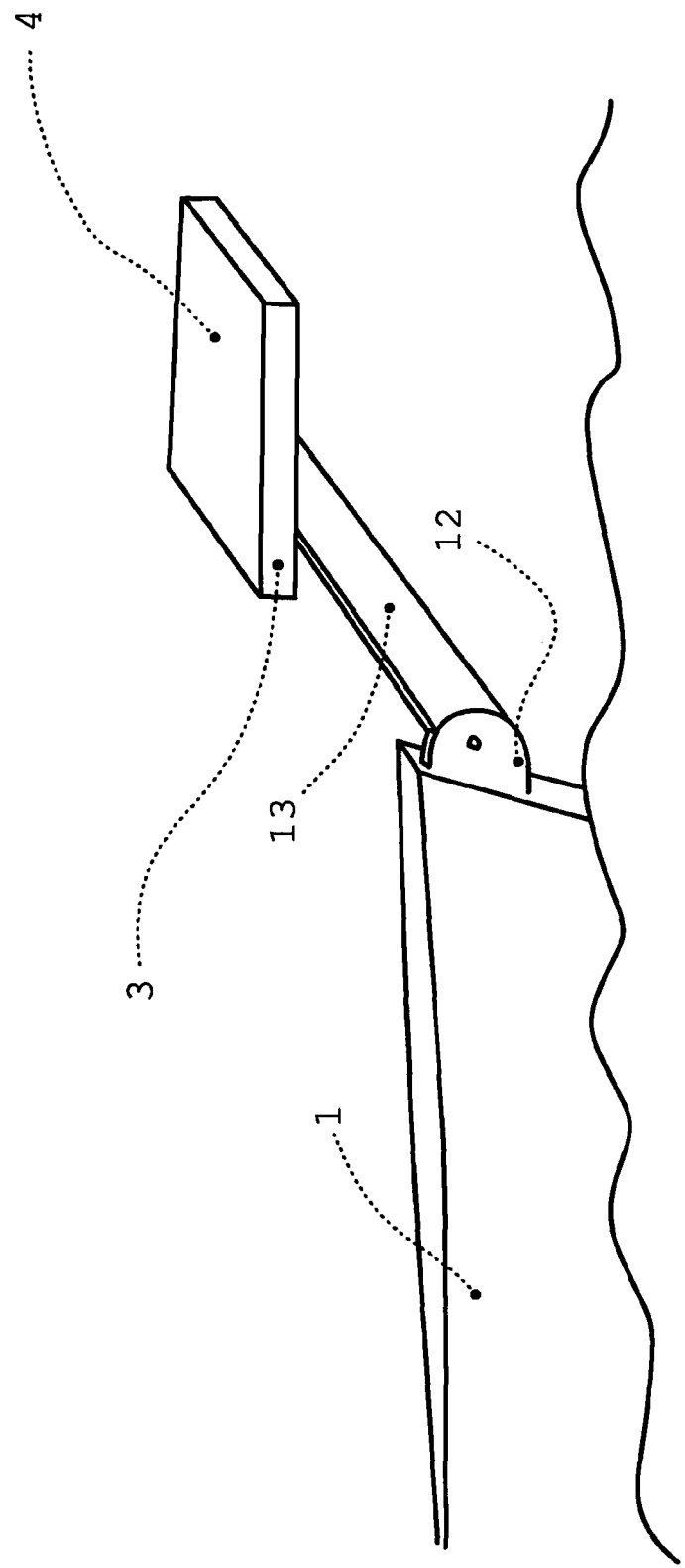

The invention shall be disclosed more in detail, reference being made to the enclosed figures, whereas FIG. 1 schematically shows a system according to the invention when landing an automatic helicopter at a vessel at sea, FIG. 2 schematically shows the sensor- and communication system used, FIG. 3 schematically shows a landing plate according to the invention, FIG. 4 schematically shows a block schedule over sensor-decision- and activity functions, FIG. 5 schematically shows a portion of a landing plate with vacuum function according to the invention, whilst FIG. 6 schematically shows a landing plate according to the invention, mounted at an arm outside of the rail of a vessel.

One embodiment of the invention is seen in the system summing up FIG. 1. The landing of the helicopter 2 occurs at a landing plate 3 at a vessel 1. Thus the after deck of the vessel 1 forms the landing place for the helicopter 2. The helicopter follows a predicted landing path 21. The path starts at an outer point where the present operative mission handling system transfers the control over the helicopter 2 to this landing system. The transfer is approved by an operator. This path passes one or several control frames 28 that are continuously adjusted after the position of the vessel 1. These control frames may be seen as sections in the approach corridor that is based upon the landing path 21. This continuous control is performed in order to protect the vessel 1 and its staff. These control frames are updated in ALC in FIG. 2. When the helicopter 2 approaches the landing plate ALC in FIG. 2 will control its identity and course in order to warrant a correct intention from the helicopter 2. The system gives, via a number of sensors, primarily INS (Inertial Navigation System) GPS (Global Position System), dDGS (Differential Global Position System) and ONS (optical Navigation System) de relative angles, the relative speed and the distance between the helicopter 2 and a landing plate 3. These sensor systems may be seen in FIG. 2 and the estimation function as block 2 in FIG. 4. When the helicopter 2 approaches the vessel 1 the sensor information (INS, GPS, dGPS and ONS) will gradually rely more and more upon the optical sensor system (ONS) in FIG. 2. The landing plate 3 is journalled in a first axis 7 in pitch and a second axis 6 in roll, and is controlled by a not shown set means. When the helicopter is in the immediate vicinity of the landing plate 3 the set means will set the landing plate 3 according to the angles shown by the undercarriage 10 of the helicopter 2. In this way the very landing moment is facilitated in that the relative distance and the relative angle is gradually diminished such that a controlled set of the helicopter 2 may be carried out. The landing plate 3 is thus adapted with its surface 4 to the vessel 1 as well as to the movements of the helicopter 2. The landing plate 3 is located at an arm 13 that moves the surface 4 of the landing plate 3, primarily up and down in order to compensate the movement of the vessel 1 in the sea. Part of this movement is compensated by the helicopter 2 itself. The arm 13 is mounted via a fastening device 12 such that the major part of the landing is carried out outside of the rail of the vessel 1. When the mutual spatial relationship between the vessel 1 and the landing plate is warranted, block 2 in FIG. 4, collision risks are controlled in the third block in FIG. 4. Then the actuators for PITCH and ROLL in FIG. 2 are controlled by the right blocks in FIG. 4. The locking itself between the surface 4 of the landing plate 3 and the undercarriage 10 of the helicopter 2 occurs by a vacuum function in small hollows 11 in the surface 4 of the landing plate 3, according to FIG. 5. If it would be necessary to stop the landing for safety reasons the vacuum function can quickly release the helicopter 2 by quickly filling the low pressure in the hollows 11 to atmospheric pressure. After landing the helicopter 2 will be ranged together with the landing plate 3 to a store place onboard the vessel 1. This solution is also used for the start of the helicopter 2. The procedure then occurs in reversed order. The low pressure in the hollows 11 is then used for facilitating the start and the lifting of the helicopter 2 by increasing the lifting force of the helicopter before the releasing from the landing plate 3 occurs.

The invention claimed is:

1. A system for automatic or auto pilot controlled landing of an air vehicle with an undercarriage having a substantially plane lower side, at a stationary or mobile landing place, with a substantially plane landing plate, wherein the landing plate is settable via two axes in roll and pitch, by set means controlled in relationship to the air vehicle and a horizontal plane, wherein the air vehicle and the landing plate are provided with a transmitter and a receiver which define and communicate a mutual distance and relative angles between the landing plate and the undercarriage, wherein said set means is arranged to set said two axes such that the landing plate is substantially parallel to the lower side of the undercarriage.

2. The system according to claim 1, wherein the landing plate and the undercarriage are provided with a locking device, arranged to catch and keep the air vehicle at the landing plate after the air vehicle has landed with the undercarriage at the landing plate.

3. The system according to claim 2, wherein the locking device is a vacuum device, and the vacuum device comprises openings in the landing plate to provide a pressure lower than an atmospheric pressure.

4. The system according to claim 2, wherein the locking device comprises a controllable magnetic device, and a corresponding magnetic material at the undercarriage.

5. The system according to claim 2, wherein the landing plate is mounted at an arm, which is provided to compensate for movements of the air vehicle horizontally and vertically.

6. The system according to claim 1, wherein mechanical elements are provided to transfer a landed air vehicle between the landing place to a storage place.

7. The system according to claim 1, further comprising comprises a part system, which defines and maintains safe zones in an air space in an immediate vicinity of the landing place, such that the air vehicle does not risk getting in dangerous vicinity of staff or material, wherein definition of zones forms a basis for automatic or manual decisions to stop ongoing landing progress.

8. The system according to claim 1, wherein the air vehicle is provided with at least two transmitters, arranged at a mutual distance along a normal vector to the plane of the lower plane of the undercarriage, and the landing plate is provided with at least three in the plane separated receivers, wherein the plane of the undercarriage in relationship to the plane of the landing plate is determinable by communication between the transmitters and the receivers.

9. The system according to claim 3, wherein the landing plate is mounted at an arm, which is provided to compensate for movements of the landing vehicle horizontally and vertically.

10. The system according to claim 4, wherein the landing plate is mounted at an arm, which is provided to compensate for movements of the landing vehicle horizontally and vertically.

11. The system according claim 2, wherein mechanical elements are provided to transfer a landed air vehicle between the landing place to a storage place.

12. The system according to claim 3, wherein mechanical elements are provided to transfer a landed air vehicle between the landing place to a storage place.

13. The system according to claim 4, wherein mechanical elements are provided to transfer a landed air vehicle between the landing place to a storage place.

14. The system according to claim 5, wherein mechanical elements are provided to transfer a landed air vehicle between the landing place to a storage place.

15. The system according to claim 2, further comprising comprises a part system, which defines and maintains safe zones in an air space in an immediate vicinity of the landing place, such that the air vehicle does not risk getting in dangerous vicinity of staff or material, wherein a definition of zones forms a basis for automatic or manual decisions to stop ongoing landing progress.

16. The system according to claim 3, further comprising comprises a part system, which defines and maintains safe zones in an air space in an immediate vicinity of the landing place, such that the air vehicle does not risk getting in dangerous vicinity of staff or material, wherein a definition of zones forms a basis for automatic or manual decisions to stop ongoing landing progress.

17. The system according to claim 4, further comprising comprises a part system, which defines and maintains safe zones in an air space in an immediate vicinity of the landing place, such that the air vehicle does not risk getting in dangerous vicinity of staff or material, wherein a definition of zones forms a basis for automatic or manual decisions to stop ongoing landing progress.

18. The system according to claim 5, further comprising comprises a part system, which defines and maintains safe zones in an air space in an immediate vicinity of the landing place, such that the air vehicle does not risk getting in dangerous vicinity of staff or material, wherein a definition of zones forms a basis for automatic or manual decisions to stop ongoing landing progress.

19. The system according to claim 6, further comprising comprises a part system, which defines and maintains safe zones in an air space in an immediate vicinity of the landing place, such that the air vehicle does not risk getting in dangerous vicinity of staff or material, wherein a definition of zones forms a basis for automatic or manual decisions to stop ongoing landing progress.

\* \* \* \* \*